(12) United States Patent
Görgülü

(10) Patent No.: US 12,053,001 B2
(45) Date of Patent: Aug. 6, 2024

(54) LEAKTIGHT FOOD FILLING DEPOSITION SYSTEM

(71) Applicant: ETI GIDA SANAYI VE TICARET ANONIM SIRKETI, Eskisehir (TR)

(72) Inventor: Ahmet Görgülü, Eskisehir (TR)

(73) Assignee: ETI GIDA SANAYI VE TICARET ANONIM SIRKETI, Eskisehir (TR)

( * ) Notice: Subject to any disclaimer, the term of this patent is extended or adjusted under 35 U.S.C. 154(b) by 968 days.

(21) Appl. No.: 16/703,746

(22) Filed: Dec. 4, 2019

(65) Prior Publication Data

US 2021/0169099 A1    Jun. 10, 2021

(51) Int. Cl.
| | | |
|---|---|---|
| *A23G 3/20* | (2006.01) | |
| *A23G 3/02* | (2006.01) | |
| *A23G 9/22* | (2006.01) | |
| *A23G 9/28* | (2006.01) | |

(52) U.S. Cl.
CPC .......... *A23G 3/20* (2013.01); *A23G 3/021* (2013.01); *A23G 3/0226* (2013.01); *A23G 9/228* (2013.01); *A23G 9/28* (2013.01)

(58) Field of Classification Search
CPC .......... A23G 3/20; A23G 3/203; A23G 3/021; A23G 9/06; A23G 9/28; A23G 9/228
See application file for complete search history.

(56) References Cited

U.S. PATENT DOCUMENTS

| | | | | |
|---|---|---|---|---|
| 5,463,878 | A * | 11/1995 | Parekh | F25B 47/022 |
| | | | | 62/394 |
| 2004/0191367 | A1 | 9/2004 | Dacey | |
| 2009/0090432 | A1 | 4/2009 | Wells et al. | |
| 2010/0133360 | A1 * | 6/2010 | Gaetano | A23G 1/045 |
| | | | | 222/137 |
| 2021/0285806 | A1 * | 9/2021 | Paurd | G01F 11/021 |

FOREIGN PATENT DOCUMENTS

| | | |
|---|---|---|
| TK | 2008/07074 | 11/2008 |
| TK | 2018/13239 | 9/2018 |

* cited by examiner

*Primary Examiner* — Kelly M Gambetta
*Assistant Examiner* — Virak Nguon
(74) *Attorney, Agent, or Firm* — Crose Law LLC; Bradley D. Crose

(57) ABSTRACT

The present invention relates to a leaktight food filling deposition system providing ease of mounting/demounting, maintenance and cleaning. The present invention particularly relates to a deposition system for depositing food fluids of various temperatures, acidities, viscosities and densities onto, between and into the food products, said deposition system being individually operated, requiring no maintenance, having a high deposition capacity, optionally allowing for each nozzle to deposit different materials and comprising low weight deposition nozzles and a low weight manifold.

5 Claims, 2 Drawing Sheets

US 12,053,001 B2

LEAKTIGHT FOOD FILLING DEPOSITION SYSTEM

TECHNICAL FIELD OF THE INVENTION

The present invention relates to a leaktight food filling deposition system providing ease of mounting/demounting, maintenance and cleaning.

The present invention particularly relates to a deposition system for depositing food fluids of various temperatures, acidities, viscosities and densities onto, between and into the food products, said deposition system being individually or integrally operated, requiring no maintenance, having a high deposition capacity and comprising low weight deposition nozzles and a low-weight manifold.

STATE OF THE ART

Devices capable of depositing fluid food inputs (materials such as batters, jams, jellies, creams, chocolates, etc.) in certain volumes and shapes at specific positions are called depositors. Depositors are used for depositing foodstuffs such as fluid batter, chocolate, cream, jelly marshmallow and the like. Primitive versions thereof are manually operated single deposition apparatuses of injector and bag type. In addition to depositing of batters for cakes, crackers and biscuits in a quantity-, shape- and position-controlled manner, they function to combine the product, such as cakes, biscuits and crackers with filling materials in a quantity- and position-controlled manner before and after baking. Moreover, they are used for depositing finished products, such as chocolates, creams, jams, etc. in a quantity-, position- and geometry-controlled manner. According to the newly developed depositor, more than one type of fluid food input can be supplied simultaneously and accurately.

In general, food depositors are operated with apparatuses such as a piston and rotary valve assembly, together with a piston and a rotary valve, geared rollers and opening-closing mechanisms and the like. Such depositors can be used with an opened chamber and a closed chamber. Open-chambered depositors can be operated at low rates (a maximum speed of 25-30 deposits/min) and lighter weight pressurized depositors can reach to a speed between 300-350 deposits/min based on the viscosity of the fluid and the amount of deposits.

Manifolds move orbitally in vertical and horizontal directions for deposition by robotic or mechanic means. Thus, their minimal individual weights have an influence on the inertial forces occurring at high speeds and the machine speed and the machine design is directly affected by the manifold weight.

Another type of depositor is used commonly in applications in which the depositor is stationary or is moved at low speeds.

The object of the newly developed nozzle, and the manifold to which the nozzles are connected, is to solve the problems which are encountered in depositor manifolds capable of depositing at high rates and which have an influence on the product quality, lead to loss of material and damage the machinery. In addition, it is intended to develop a novel deposition system providing a fast product replacement and allowing each nozzle to be also operated independently.

Based on a review of the state of the art, patent document numbered "2018/13239" has been examined. According to the abstract of the invention forming the subject matter of the application, "The invention relates to a depositor comprising a cassette, which allows for depositing the final product in fluid form into the molds with an accurate basis weight in the manufacturing lines used in chocolate production and for distributing the inputted chocolate into the molds via a rotary and injector system in the product chamber arranged in the lower part. In particular, the invention relates to a device having an intake/pulling surface and an exhaust surface, which separates an injection system from a product chamber by positioning between the product chamber and a cassette; transfers the product received from the chamber to the injection system by bringing the product into an intake and exhaust position by means of a movement of a rotary driving member, and/or holds the product within itself".

Based on a review of the state of the art, patent document numbered "2008/07074" has been examined. According to the abstract of the invention forming the subject matter of the invention relates automated application, "The to fully deposition machines having at least one lower/upper object separator, at least one upper object holder, at least one alt object holder, at least one upper conveyor, at least one lower conveyor, for allowing objects made of any material to move in a certain sequence after the production stage, comprising at least one inverting apparatus having a holder placed on the lower conveyor allowing for the objects moving received in a sequence from a gap between the lower/upper object separator and the upper conveyor to be inverted and capable of releasing the object thereon in an inverted position with circular motions onto the lower conveyor".

Based on a review of the state of the art, patent document numbered "US20090090432" has been examined. The invention forming the subject matter of the application describes a depositor for supplying the measured amounts of batter to baking containers and a method of operation thereof.

Based on a review of the state of the art, patent document numbered "US2004191367" has been examined. The invention forming the subject matter of the application describes a depositor for releasing a plurality of independent flows of food with various fluidities (color and/or composition) at specified intervals and a method for forming a striped foodstuff.

Deposition apparatuses used in the state of the art have problems leading to major quality issues such as product replacement, fluid leakages resulting from wear in short time, contaminations of food with metal or plastic, speed issues, leakage issues, maintenance and cleaning issues. Such manifolds consisting of aluminum, bronze, stainless steel and engineering plastics and operating with narrow running clearances (tolerance) wear in short time and result in contamination of the food with non-food materials. Moreover, especially when processing materials containing sugar derivatives, crystallization and carbonization of the sugar due to the high heat and temperatures in running clearances lead to wearing and jamming in short time. Also, in these systems there is no feature of product presence-absence notification and individual operability.

Some types of depositors used in the state of the art may have many holes. Adjusting bolts attached to an upper plate are used for the individual adjustment of a fluid deposited from each of the holes of such manifolds. The whole manifold should be replaced in situations where the number of nozzles will vary according to changes in the product pitch. Due to the running clearance between the rotary valve and the body in which the valve operates, rotary valve blokes the chamber pathway with a 45-90-degree rotation. The requirement of a manifold to move at high speeds (150 stroke/min) and the weight become very important. Narrow running clearances preventing leak-tightness, crystalline materials (sugar, etc.) in food inputs, temperature, acidity and pressure will result in deformations and leakages will become to occur in short time. In general, the whole manifold should be replaced due to the wearing of the body. Also, because of the narrow running clearances, the rotary valve will stick to the body and become blocked due to the leakage of fluid into the running clearance. Due to the movement of the rotary valve, and the acidity and temperature of the fluid, the body, the lid, the chamber and the nozzle plate will generally wear, resulting in the contamination of food with the wearing material.

In such depositors provided with pressurized rotary valves used in the state of the art, prismatic valves moving longitudinally are used in addition to rotary valves. In this manifold, the axial movement of the valve within the prismatic slot is more difficult due to the operation accuracy and the angled structure, causing leakages to occur in short time. Especially in cases where hot fluids are used, running clearances will deform due to the thermal expansion differences between materials, and narrow running clearances will lead to blockades and wide running clearances will lead to leakages. Since the valve is one piece, there is no possibility of a single deposit. Because of the operation under pressure and the absence of a separate piston assembly, a back-suction technique used to prevent dripping and leakage after depositing is applied.

Depositors using non-pressurized rotary pistons used in the state of the art generally operates at low speeds. In these systems, the fluid is sucked from a container (vessel) by means of a piston carrying out intake and exhaust operations and a cylinder thereof, and the fluid is deposited to a desired position by the rotational movement of the rotary valve in a direction from the container to the deposition site. The number of deposits in this system can be equal to the number of pistons. Based on the viscosity and density of the fluid and the geometrical height control accuracy of the fluid in the container, a deposit quantity sensitivity occurs.

As a consequence, due to the problems mentioned above and the inability of the present solutions about the subject matter, there is a need for an improvement in the related art.

OBJECTS OF THE INVENTION

The most important object of the present invention is to develop a nozzle that is not leaky or dripping.

A further object of the present invention is to avoid leakages and material contaminations by a specific opening-closing mechanism and a sealing design.

The most important object of the present invention is to eliminate the rotational or frictional members in contact with the fluid, and to provide for simplicity, possibility of individual operation and lightness.

A further object of the present invention is to provide for a "no product-no deposit" logic by detecting the missing products in virtue the possibility of operating each nozzle individually.

A further object of the present invention is to provide for advantages such as ease of maintenance, ease of adjustment, ease of mounting-demounting and ease of product replacement as a result of absence of the rotational or frictional members.

A further object of the present invention is to provide for a continuous food safety as a result of absence of the moving components in contact with the food.

Another object of the present invention is to reduce the maintenance costs and the loss of material in product replacements, as a result of the ease of mounting/demounting, maintenance and cleaning.

Another object of the present invention is to shorten the interruption times, as well as to reduce additional costs added to the product, as a result of the ease of mounting/demounting, maintenance and cleaning.

A further object of the present invention is to allow for each nozzle to deposit different materials.

Structural and characteristic features and all advantages of the present invention will become more apparent from the following drawings and the detailed description given with reference to these drawings. Accordingly, any review should be made taking into account these drawings and the detailed description.

REFERENCE NUMERALS

Figure 1:
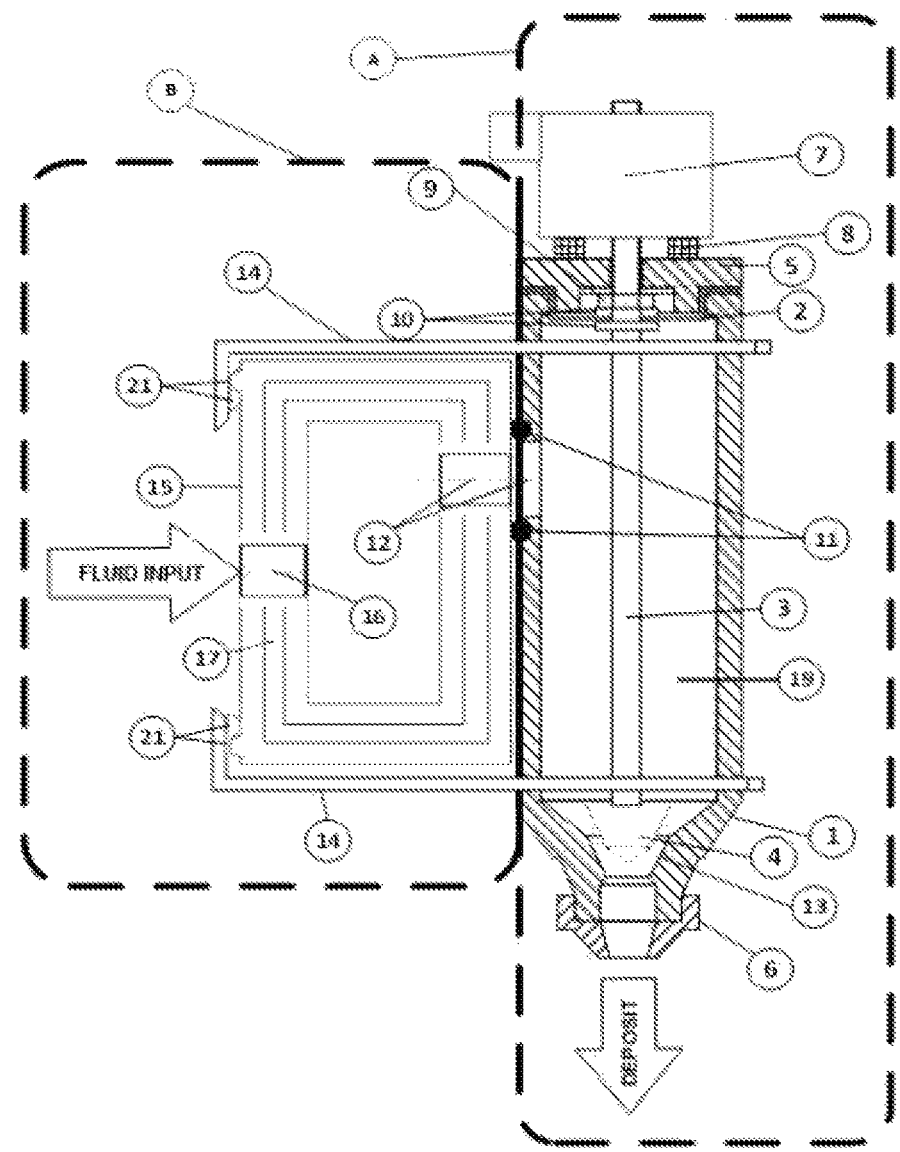
FIG. 1 is a sectional view of the deposition system according to the invention.
Figure 2:
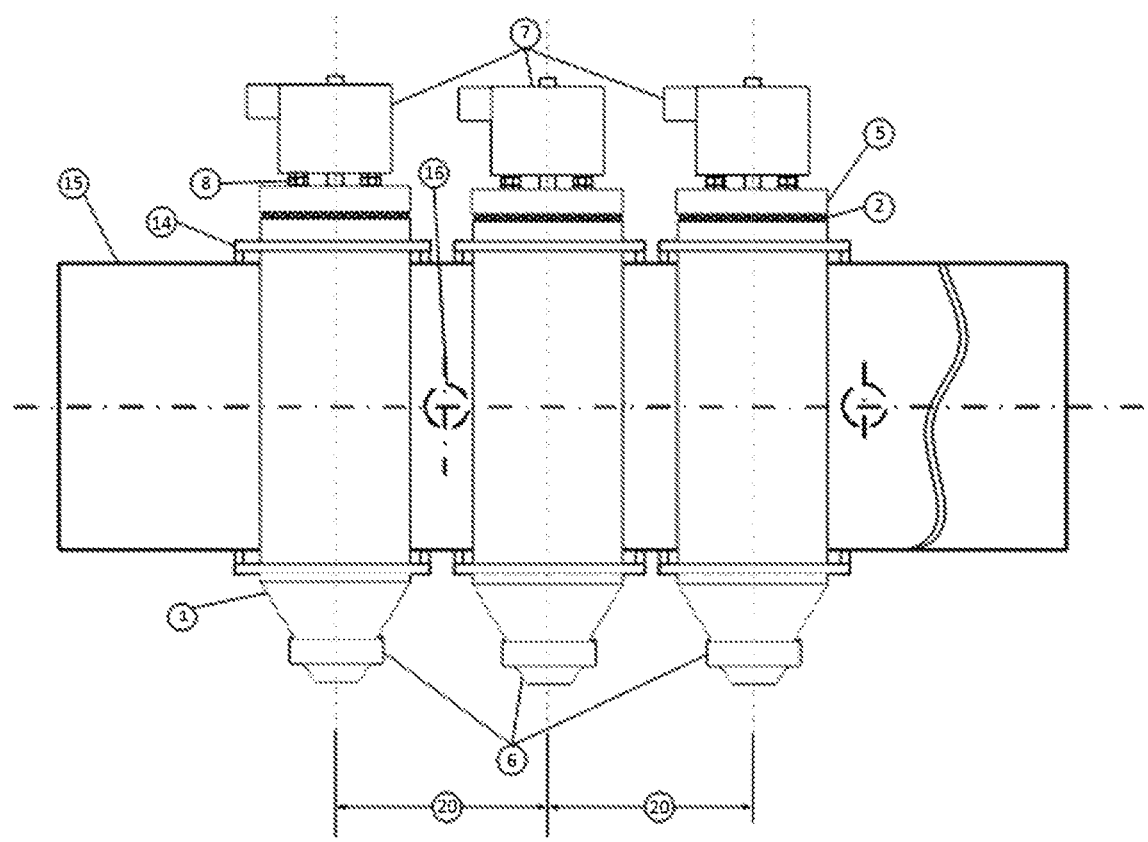
FIG. 2 is a mounting diagram for the deposition system according to the invention.

A. Deposition Nozzle
B. Manifold
1. Nozzle Body
2. Gasket
3. Valve Shaft
4. Piston
5. Lid
6. Nozzle Endpiece
7. Solenoid Valve
8. Fitting Block
9. Nut
10. Washer
11. O-Ring
12. Nozzle Ports
13. Fluid Channel
14. Grip
15. Distribution Manifold
16. Pressure Hole
17. Wall
19. Nozzle Chamber
20. Deposition Pitch
21. Fitting Grooves

DESCRIPTION OF THE INVENTION

The inventive deposition system consists essentially of a manifold (B) and a deposition nozzle (A) assembly which is easily mountable on the manifold (B) and operable individually.

The deposition nozzle (A) consists essentially of a nozzle body (1), a lid (5) and a rubber gasket (2) suitable for food used to provide leak-tightness, a valve shaft (3), a piston (4), a solenoid valve (7), a fitting block (8), a deposition channel (13) and a nozzle chamber (19).

The manifold (B) consists essentially of nozzle ports (12), a grip (14), a distribution manifold (15), a pressure hole (16) and a wall (17).

The deposition nozzle (A) is provided with a piston (4) operating vertically to open and close the fluid channel (13). The fluid flows into the distribution manifold (15) through pressure holes (16) made from behind or above a pipe and applies pressure. In situations where it is desired to maintain the temperature of the fluid, the distribution manifold (15) may be provided with two walls (17) and a refrigerant can be flowed through the wall (17). The food fluid to be deposited passes from the distribution manifold (15) to each of the deposition nozzles (A) through nozzle ports (12) arranged on the distribution manifold (15) and the deposition nozzle (A) and flows into the nozzle chamber (19).

The vertical piston (4) which is normally in closed state keeps the deposition channel (13) closed and the pressure within the distribution manifold (15) and within the nozzle chamber (19) arranged in the nozzle body (1) rises due to the controlled flow rate of the fluid input from the pump. Valve shaft (3) is tightly connected to a rubber gasket (2) suitable for food arranged in the upper part of deposition nozzle (A) for sealing via two washers (10) and a nut (9). The rubber gasket (2) is sealingly connected to the nozzle body (1) via a lid (5). Each deposition nozzle (A) is connected by the solenoid valve (7) attached to the valve shaft (3) and the resilient fitting block (8) arranged on the lid (5) holding the rubber gasket (2). The fitting block (8) allows for connecting the solenoid valve (7) to the nozzle body (1). When the deposition signal is received, the solenoid valve (7) on each of the deposition nozzles (A) is powered, and the valve shaft (3) moves upwards to open the deposition channel (13) for performing the deposition operation. The amount to be deposited can be controlled by adjusting the powering duration of the solenoid valve (7) and accordingly the valve duration of the solenoid valve (7). Deposition signal is triggered in the presence of each deposition site or a product. The diameter and geometry of the endpiece (6) located downstream of the deposition nozzle (A) can be changed based on the amount, viscosity, fluidity and density of the fluid. The deposition nozzles (A) can be fixed to the distribution manifold (15) by means of a resilient seal (O-Ring) (11) suitable for food to provide sealing, the grips (14) for quick attachment and the fitting grooves (21). The deposition nozzles (A) can be demounted by separating the solenoid valve (7) sockets and the grips (14). The deposition nozzles (A) are mounted on the distribution manifold (15) by taking into account the deposition pitch (20).

The inventive deposition system completely eliminates the risks of blockade, wearing, leakage an contamination resulting from the narrow running clearances between the rotating and moving valves and the body in the state of the art. The contact provided by the piston (4) between the solenoid valve (7) and the nozzle body (1) is only achieved in a controlled manner in a vertical direction and in a contact opening-closing fashion. Moreover, a deposition control can be achieved based on a signal regarding the presence and absence of the products, and an amount control can be provided automatically by adjusting the opening-closing duration for each deposition nozzle (A) by detecting the amounts deposited by each deposition nozzle (A). For fluids requiring temperature control, the distribution manifold (15) can exchange heat with the deposition nozzles (A).

Since they are demountable and consists of individual components, the deposition system, the deposition nozzle (A) and the manifold (B) of the invention have a structure which requires no maintenance, which can be adjusted easily, which avoids contamination, which is leaktight and which can be opened and closed individually.

The invention claimed is:

1. A food filling deposition system, characterized by comprising:
   a plurality of deposition nozzles (A) consisting of a piston (4) connected to a valve shaft and operated in a vertical direction for opening and closing a fluid channel (13) in order to perform a deposition; a solenoid valve (7) powered to move the valve shaft (3) vertically for controlling the amount to be deposited by adjusting the powering duration and the valve duration; a fitting block (8) connecting the solenoid valve (7) to a nozzle body (1); and a nozzle chamber (19) arranged in the nozzle body (1) for allowing a food fluid to be deposited to pass through a distribution manifold (15);
   a manifold (B) consisting of nozzle ports (12) arranged on the distribution manifold (15) and the deposition nozzle (A) for allowing food fluid to be deposited to flow from the distribution manifold (15) to each of the deposition nozzles (A); pressure holes (16) arranged on a pipe for allowing the fluid to flow into the distribution manifold (15) and providing pressure; a wall (17) through which a refrigerant flows in situations where it is desired to maintain the temperature of the fluid; a grip (14) for demounting the deposition nozzles (A); and a distribution manifold (15) to provide heat exchange for the deposition nozzles (A) for the fluids requiring temperature control.

2. A food filling deposition system according to claim 1, characterized by comprising an endpiece (6) for adjusting the diameter and geometry of the fluid output from the each of the deposition nozzles (A) based on the amount, viscosity, fluidity and density of the fluid.

3. A food filling deposition system according to claim 1, characterized in that, said food filling deposition system having a structure allowing for a connection providing for the plurality of deposition nozzles (A) to be mounted on the distribution manifold (15) at different intervals (pitches) (20).

4. A food filling deposition system according to claim 1, characterized by comprising a resilient seal (11) suitable for food to provide sealing between the each of the deposition nozzles (A) and the distribution manifold (15).

5. A food filling deposition system according to claim 1, characterized by comprising a leaktight connection to the valve shaft (3) for sealing of the upper part of the each of the deposition nozzles (A) by means of a rubber gasket (2) suitable for food, a washer (10) and a nut (9).

* * * * *